(No Model.) 2 Sheets—Sheet 1.

J. O. LOSE.
ONE WHEELED VEHICLE.

No. 325,548. Patented Sept. 1, 1885.

Witnesses:
Andrew B. Inglis.
John H. Reynolds.

Inventor:
John Otto Lose
By John F. Kerr
Attorney (No Model.) 2 Sheets—Sheet 2.

J. O. LOSE.
ONE WHEELED VEHICLE.

No. 325,548. Patented Sept. 1, 1885.

Witnesses:
John H. Reynolds.
Andrew B. Inglis.

Inventor.
John Otto Lose
By John F. Kerr
Attorney.

UNITED STATES PATENT OFFICE.

JOHN OTTO LOSE, OF PATERSON, NEW JERSEY.

ONE-WHEELED VEHICLE.

SPECIFICATION forming part of Letters Patent No. 325,548, dated September 1, 1885.

Application filed April 22, 1885. (No model.)

*To all whom it may concern:*

Be it known that I, JOHN OTTO LOSE, a subject of the Emperor of Germany, residing at Paterson, in the county of Passaic and State of New Jersey, have invented certain new and useful Improvements in One-Wheeled Vehicles; and I do hereby declare that the following is a full, clear, and exact description of the invention.

My invention relates to a unicycle or one-wheeled vehicle, without spokes, which will carry one or more persons, as well as a bicycle or tricycle, and which is operated from within, carries the passenger inside, and only one wheel touching the ground. I attain these objects by the means of the devices illustrated in the accompanying drawings, in which—

Figure 1:
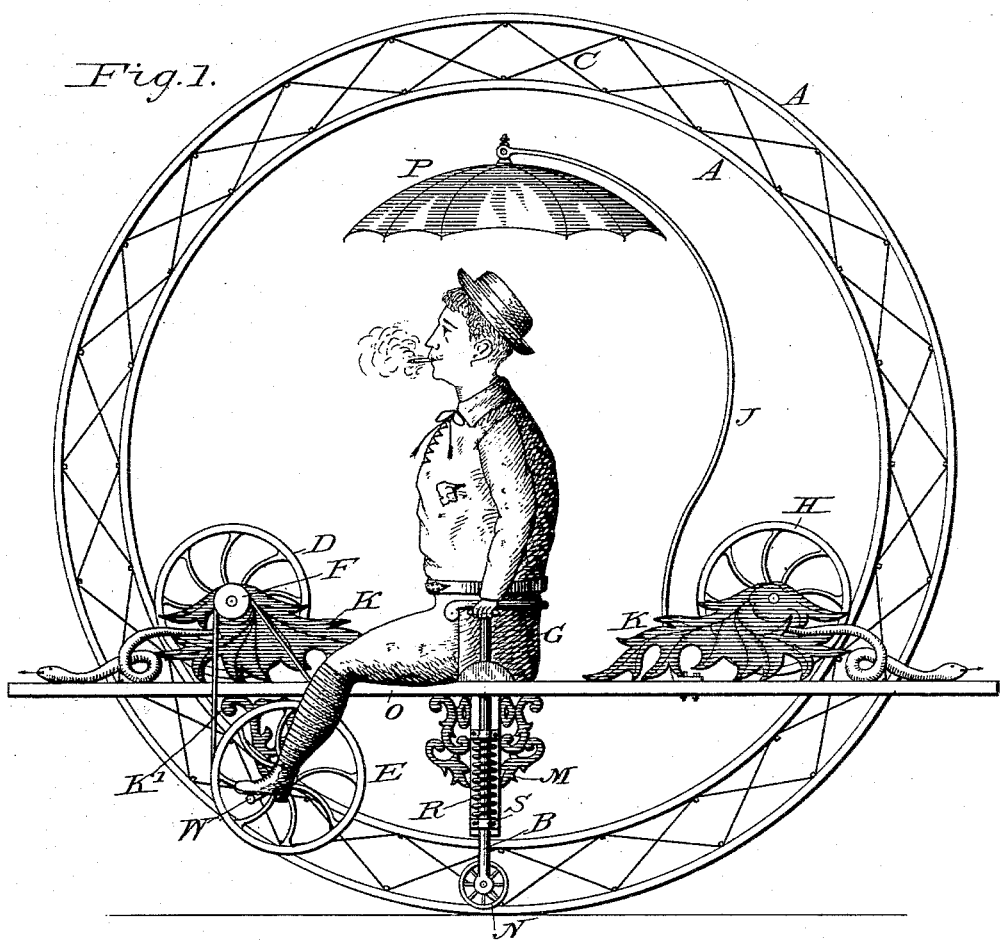
Figure 2:
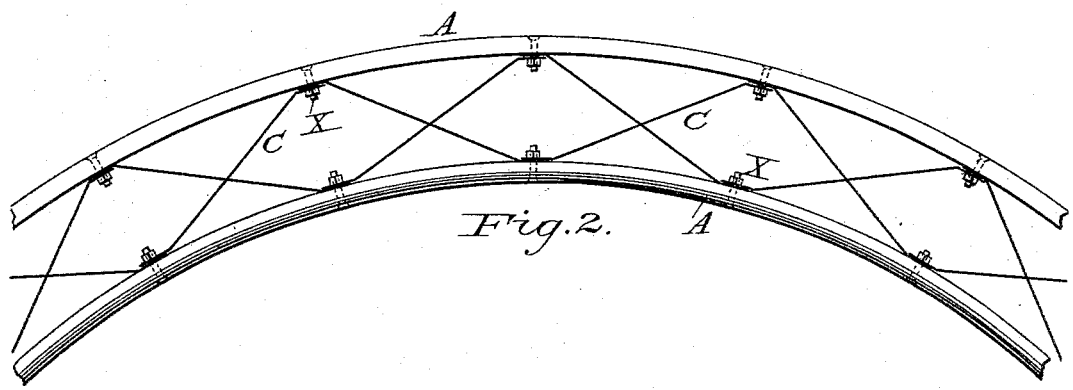
Figure 3:
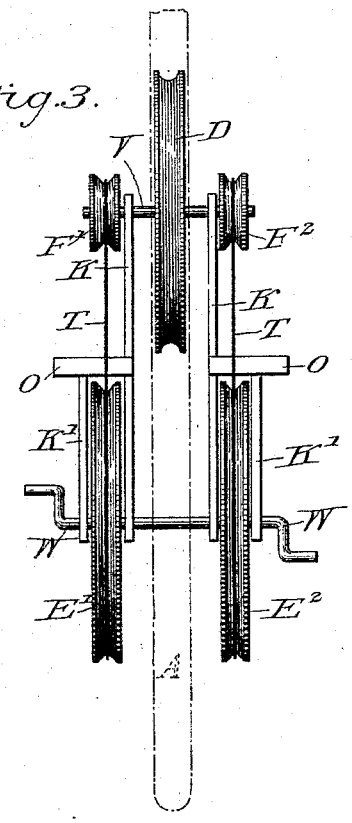
Figure 4:
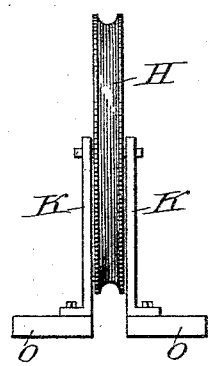
Figure 5:
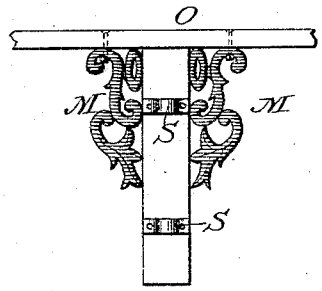
Figure 6:
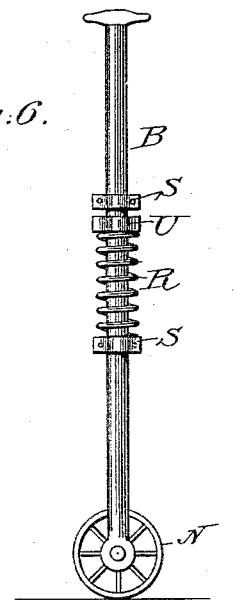

Figure 1 is a side view of the unicycle in working order. Fig. 2 is a sectional view of the large wheel A, showing the method of its construction. Fig. 3 is a front sectional view of the driving apparatus. The dotted line A represents the large wheel; W, the treadle-shaft; E' and E², the treadle-wheels, suspended from platform O by brackets K'. D is a large driving-wheel with small driving-wheels F' and F² on the driving-shaft V. T is a belt connecting the treadle-wheels E with small driving-wheels F' and F². K is the shoulder in which the driving-shaft V is secured, and which supports the same. Fig. 4 is a front view of the idler-wheel H, fastened by a bracket or shoulder, K, to platform O. Fig. 5 is a sectional view of the steering apparatus B, bracket M, bolted to the platform O, and boxes S, through which the round steering-rod works. Fig. 6 is steering-rod B, wheel N, spiral spring R, secured to rod B by the collar U.

A is a double-rim steel wheel, the outer and inner rims being connected by steel braces c. The outer rim is grooved, and a round rubber tire is fitted in said groove.

D is a large driving-wheel, with a smaller driving or pulley wheel, F, on each side of it, all secured on the one driving-shaft V, and have hollow or concave rims to enable the large driving-wheel D to receive and travel on the inner rim of the large wheel A, and to allow the small pulley-wheels F to receive the belt T.

The grooved rim of the driving-wheel D is lined with a thin sheet of leather or rubber, so as to engage and create a friction when in contact with the inner rim of large wheel A, and to set the same in motion.

E are the treadle-wheels on the treadle-shaft W, one treadle-wheel being on each side of the large wheel A, and are suspended from the platform O on the hangers or brackets K'. The belt T passes from the treadle-wheels E on the small driving-wheels F.

O is a platform, on which is placed seat G. The platform separates and passes on either side of the large wheel A, both at the front and rear end of the platform, an opening being made for that purpose.

All of the wheels and steering apparatus are secured to said platform.

The only parts that come in contact with the large wheel A are the driving-wheel D and the idler H.

K is scroll-work, of iron or other material, secured to platform O, and form shoulders, in which are secured the spindles of the driving-wheel D and the idler H. The idler H has a grooved or hollow rim, and the inner rim of the large wheel A, which is half-round, fits into said groove, and when the large wheel A revolves the idler H also revolves freely in its bearings K.

The steering apparatus is supported by the scroll-work bracket M beneath the seat.

B is the steering-rod, around which is a spiral spring, R, secured thereto by a pin or collar, U, midway between the handle and lower end between the two boxes S, the lower box S forming bearing for said spring. On the lower end of rod is small steering-wheel N. When it is desired to steer to the left, the left-hand rod must be pressed down until the small steering-wheel touches the ground, the body of the rider being inclined slightly in that direction, and as the small steering-wheel will then describe a smaller circle than the large wheel A the unicycle must necessarily turn to the left. The same steering device is attached to the right-hand side of vehicle, and is operated in order to steer to the right.

The unicycle is constructed as above described and set forth in the accompanying drawings. The seat, platform, steering device, treadle and driving-wheels, and idler are all connected and form one part of the vehicle, and may be removed or lifted completely out of the large double-rim steel wheel A, and A forms another complete and separate part of the machine or vehicle. The platform and wheels being placed in the large double-rim steel wheel A, it is in working position, as seen in Fig. 1. The only parts in contact with large wheel A are the driving-wheel D and the idler H. The whole weight of the person is on these two wheels.

When the machine is not in operation, it will stand by itself, for the treadle and driving wheels being heavier than the idler-wheel H, H will rise and the front part of platform will drop, and the treadle-wheels will rest on the ground, one on each side of the large wheel A, as is shown in Fig. 7, where a person is about to start or leave the unicycle. When a person takes the seat and uses the treadles, the treadle-wheels E will move upward, and, taking the position seen in Fig. 1, will revolve. The belt T, connecting the treadle-wheels and the driving-wheels F, will cause the driving-wheel D to revolve, which, by friction with the inner rim of large wheel A, forces it to revolve also, and the machine is in operation.

This unicycle is very easily balanced, and can be used without any fear of danger. It can be turned as quickly and in a smaller space than can the ordinary bicycle by manipulating the steering-rods B.

Suppose one of the small steering-wheels be turned outward at right angles to the large wheel A, it becomes a break and forms the center of the smallest circles that the large wheel A will describe.

In going up hill an eccentric weight may be attached beneath the seat or platform, made to slide along the same, and held at any distance from the center between the center and front of large wheel A, according to the incline of the hill. Instead of an umbrella, P, a lantern may be suspended.

By putting in a box-seat this unicycle will be especially adapted for ladies' and children's use.

I may operate my unicycle by either clockwork or steam, instead of foot-power.

A small boiler may be placed under the platform O, with steam-pipe to convey the steam to the inner rim of the large wheel A, which rim will have openings at regular intervals leading to cavities within the rim or between the inner and outer rim. The steam from pipe striking opening in the rim will penetrate the cavity with a downward force sufficient to propel the unicycle. The cavities, of course, will be provided with a small vent-hole.

What I claim as my invention, and desire to secure by Letters Patent, is—

In a unicycle or one-wheeled vehicle without spokes, the combination of the large wheel A, platform O, attachments K' and K, treadle-wheels E' and E², driving-wheels F', F², and D, belting T, idler-wheel H, steering apparatus B, spiral spring R, secured to rod B by collar U, and small steering-wheel N, substantially as shown and described, and for the purpose specified.

JOHN OTTO LOSE.

Witnesses:
WM. L. THOMSON,
GEO. A. ALBUTT.